United States Patent
Richardson et al.

(10) Patent No.: US 8,938,526 B1
(45) Date of Patent: *Jan. 20, 2015

(54) REQUEST ROUTING MANAGEMENT BASED ON NETWORK COMPONENTS

(75) Inventors: David R. Richardson, Seattle, WA (US); John Cormie, Seattle, WA (US); Colm MacCarthaigh, Seattle, WA (US); Benjamin W. S. Redman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/892,889

(22) Filed: Sep. 28, 2010

(51) Int. Cl.
*G06F 15/173* (2006.01)

(52) U.S. Cl.
USPC ............................ 709/223; 709/217; 709/238

(58) Field of Classification Search
USPC ......... 709/201, 223, 224, 230, 231, 232, 238, 709/217
See application file for complete search history.

(56) References Cited

U.S. PATENT DOCUMENTS

| | | |
|---|---|---|
| 5,341,477 A | 8/1994 | Pitkin et al. |
| 5,611,049 A | 3/1997 | Pitts |
| 5,774,660 A | 6/1998 | Brendel et al. |
| 5,852,717 A | 12/1998 | Bhide et al. |
| 5,892,914 A | 4/1999 | Pitts |
| 5,933,811 A | 8/1999 | Angles et al. |
| 5,974,454 A | 10/1999 | Apfel et al. |
| 6,016,512 A | 1/2000 | Huitema |
| 6,026,452 A | 2/2000 | Pitts |
| 6,052,718 A | 4/2000 | Gifford |
| 6,078,960 A | 6/2000 | Ballard |
| 6,085,234 A | 7/2000 | Pitts et al. |
| 6,098,096 A | 8/2000 | Tsirigotis et al. |
| 6,108,703 A | 8/2000 | Leighton et al. |
| 6,157,942 A | 12/2000 | Chu et al. |
| 6,167,438 A | 12/2000 | Yates et al. |

(Continued)

FOREIGN PATENT DOCUMENTS

| | | |
|---|---|---|
| CN | 1422468 A | 6/2003 |
| CN | 1605182 A | 4/2005 |

(Continued)

OTHER PUBLICATIONS

International Search Report and Written Opinion in PCT/US2011/061486 mailed Mar. 30, 2012 in 11 pages.

(Continued)

*Primary Examiner* — Jimmy H Tran
(74) *Attorney, Agent, or Firm* — Knobbe, Martens, Olson & Bear, LLP

(57) ABSTRACT

Systems and methods for managing request routing functionality associated with resource requests for one or more resources associated with a content provider are provided. A content delivery network ("CDN") service provider, on behalf of a content provider, can process domain name service ("DNS") requests for resources by computing devices and resolve the DNS requests by the identification of a network address of a computing device that will provide the requested resources. Based on the processing of DNS queries initiated by a client computing device, the CDN service provider can measure CDN service provider latencies associated with the generation of DNS requests by network components associated with the client computing devices. Examples of the network components can include DNS resolvers associated with the client computing devices.

32 Claims, 9 Drawing Sheets

(56) References Cited

U.S. PATENT DOCUMENTS

| | | |
|---|---|---|
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,405,252 B1 | 6/2002 | Gupta et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,505,241 B2 | 1/2003 | Pitts |
| 6,529,953 B1 | 3/2003 | Van Renesse |
| 6,553,413 B1 | 4/2003 | Lewin et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,665,706 B2 | 12/2003 | Kenner et al. |
| 6,678,791 B1 | 1/2004 | Jacobs et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 * | 8/2004 | McCanne ..................... 718/105 |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,874,017 B1 | 3/2005 | Inoue et al. |
| 6,928,467 B2 | 8/2005 | Peng |
| 6,941,562 B2 | 9/2005 | Gao et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B1 | 3/2006 | Sitaraman et al. |
| 7,024,466 B2 | 4/2006 | Outten et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 * | 8/2006 | Lewin et al. ................. 709/226 |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 * | 11/2006 | Dilley et al. .................. 709/219 |
| 7,136,922 B2 | 11/2006 | Sundaram et al. |
| 7,139,821 B1 | 11/2006 | Shah et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 * | 7/2007 | Wein et al. ..................... 709/214 |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,269,784 B1 | 9/2007 | Kasriel et al. |
| 7,274,658 B2 * | 9/2007 | Bornstein et al. ............. 370/227 |
| 7,289,519 B1 | 10/2007 | Liskov |
| 7,293,093 B2 * | 11/2007 | Leighton et al. .............. 709/226 |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,373,416 B2 * | 5/2008 | Kagan et al. .................. 709/232 |
| 7,376,736 B2 | 5/2008 | Sundaram et al. |
| 7,380,078 B2 | 5/2008 | Ikegaya et al. |
| 7,398,301 B2 | 7/2008 | Hennessey et al. |
| 7,430,610 B2 | 9/2008 | Pace et al. |
| 7,441,045 B2 * | 10/2008 | Skene et al. .................. 709/241 |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 * | 1/2009 | Neerdaels ..................... 709/223 |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,594,189 B1 | 9/2009 | Walker et al. |
| 7,596,619 B2 | 9/2009 | Leighton et al. |
| 7,623,460 B2 | 11/2009 | Miyazaki |
| 7,624,169 B2 | 11/2009 | Lisiecki et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,622 B1 * | 2/2010 | Douglis et al. ................ 709/224 |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 * | 5/2010 | Gunaseelan et al. ............ 705/59 |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,765,304 B2 * | 7/2010 | Davis et al. ................... 709/227 |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,809,597 B2 | 10/2010 | Das et al. |
| 7,813,308 B2 | 10/2010 | Reddy et al. |

(56) References Cited

U.S. PATENT DOCUMENTS

| | | | |
|---|---|---|---|
| 7,814,229 B1 | 10/2010 | Cabrera et al. | |
| 7,818,454 B2 | 10/2010 | Kim et al. | |
| 7,836,177 B2 | 11/2010 | Kasriel et al. | |
| 7,890,612 B2 * | 2/2011 | Todd et al. | 709/220 |
| 7,904,875 B2 | 3/2011 | Hegyi | |
| 7,912,921 B2 | 3/2011 | O'Rourke et al. | |
| 7,925,782 B2 | 4/2011 | Sivasubramanian et al. | |
| 7,930,393 B1 | 4/2011 | Baumback et al. | |
| 7,930,427 B2 | 4/2011 | Josefsberg et al. | |
| 7,933,988 B2 | 4/2011 | Nasuto et al. | |
| 7,937,477 B1 | 5/2011 | Day et al. | |
| 7,949,779 B2 | 5/2011 | Farber et al. | |
| 7,962,597 B2 | 6/2011 | Richardson et al. | |
| 7,966,404 B2 | 6/2011 | Hedin et al. | |
| 7,970,816 B2 | 6/2011 | Chess et al. | |
| 7,970,940 B1 | 6/2011 | van de Ven et al. | |
| 7,979,509 B1 | 7/2011 | Malmskog et al. | |
| 7,991,910 B2 | 8/2011 | Richardson et al. | |
| 7,996,533 B2 | 8/2011 | Leighton et al. | |
| 7,996,535 B2 | 8/2011 | Auerbach | |
| 8,000,724 B1 | 8/2011 | Rayburn et al. | |
| 8,028,090 B2 | 9/2011 | Richardson et al. | |
| 8,041,809 B2 * | 10/2011 | Sundaram et al. | 709/224 |
| 8,041,818 B2 | 10/2011 | Gupta et al. | |
| 8,065,275 B2 | 11/2011 | Eriksen et al. | |
| 8,069,231 B2 | 11/2011 | Schran et al. | |
| 8,073,940 B1 | 12/2011 | Richardson et al. | |
| 8,082,348 B1 | 12/2011 | Averbuj et al. | |
| 8,117,306 B1 | 2/2012 | Baumback et al. | |
| 8,122,098 B1 | 2/2012 | Richardson et al. | |
| 8,122,124 B1 | 2/2012 | Baumback et al. | |
| 8,135,820 B2 | 3/2012 | Richardson et al. | |
| 8,156,243 B2 | 4/2012 | Richardson et al. | |
| 8,190,682 B2 | 5/2012 | Paterson-Jones et al. | |
| 8,224,986 B1 | 7/2012 | Liskov et al. | |
| 8,234,403 B2 | 7/2012 | Richardson et al. | |
| 8,239,530 B2 | 8/2012 | Sundaram et al. | |
| 8,250,211 B2 | 8/2012 | Swildens et al. | |
| 8,266,288 B2 | 9/2012 | Banerjee et al. | |
| 8,266,327 B2 | 9/2012 | Kumar et al. | |
| 8,291,117 B1 | 10/2012 | Eggleston et al. | |
| 8,301,645 B1 | 10/2012 | Crook | |
| 8,321,568 B2 | 11/2012 | Sivasubramanian et al. | |
| 8,402,137 B2 | 3/2013 | Sivasubramanian et al. | |
| 8,452,874 B2 | 5/2013 | MacCarthaigh et al. | |
| 8,468,222 B2 | 6/2013 | Sakata et al. | |
| 8,521,851 B1 | 8/2013 | Richardson et al. | |
| 8,521,908 B2 | 8/2013 | Holmes et al. | |
| 8,527,658 B2 | 9/2013 | Holmes et al. | |
| 8,577,992 B1 * | 11/2013 | Richardson et al. | 709/217 |
| 8,615,549 B2 | 12/2013 | Knowles et al. | |
| 8,626,950 B1 | 1/2014 | Richardson et al. | |
| 8,639,817 B2 | 1/2014 | Sivasubramanian et al. | |
| 8,676,918 B2 | 3/2014 | Richardson et al. | |
| 8,688,837 B1 | 4/2014 | Richardson et al. | |
| 8,732,309 B1 | 5/2014 | Richardson et al. | |
| 8,756,325 B2 | 6/2014 | Sivasubramanian et al. | |
| 8,756,341 B1 | 6/2014 | Richardson et al. | |
| 8,782,236 B1 | 7/2014 | Marshall et al. | |
| 2001/0000811 A1 | 5/2001 | May et al. | |
| 2001/0025305 A1 | 9/2001 | Yoshiasa et al. | |
| 2001/0032133 A1 | 10/2001 | Moran | |
| 2001/0034704 A1 | 10/2001 | Farhat et al. | |
| 2001/0049741 A1 | 12/2001 | Skene et al. | |
| 2001/0052016 A1 | 12/2001 | Skene et al. | |
| 2001/0056416 A1 | 12/2001 | Garcia-Luna-Aceves | |
| 2001/0056500 A1 | 12/2001 | Farber et al. | |
| 2002/0002613 A1 | 1/2002 | Freeman et al. | |
| 2002/0007413 A1 | 1/2002 | Garcia-Luna-Aceves et al. | |
| 2002/0048269 A1 | 4/2002 | Hong et al. | |
| 2002/0049608 A1 | 4/2002 | Hartsell et al. | |
| 2002/0052942 A1 | 5/2002 | Swildens et al. | |
| 2002/0062372 A1 | 5/2002 | Hong et al. | |
| 2002/0068554 A1 | 6/2002 | Dusse | |
| 2002/0069420 A1 | 6/2002 | Russell et al. | |
| 2002/0078233 A1 | 6/2002 | Biliris et al. | |
| 2002/0082858 A1 | 6/2002 | Heddaya et al. | |
| 2002/0083118 A1 | 6/2002 | Sim | |
| 2002/0083148 A1 | 6/2002 | Shaw et al. | |
| 2002/0087374 A1 | 7/2002 | Boubez et al. | |
| 2002/0092026 A1 | 7/2002 | Janniello et al. | |
| 2002/0099616 A1 | 7/2002 | Sweldens | |
| 2002/0099850 A1 | 7/2002 | Farber et al. | |
| 2002/0101836 A1 | 8/2002 | Dorenbosch | |
| 2002/0107944 A1 | 8/2002 | Bai et al. | |
| 2002/0112049 A1 | 8/2002 | Elnozahy et al. | |
| 2002/0116481 A1 | 8/2002 | Lee | |
| 2002/0116491 A1 | 8/2002 | Boyd et al. | |
| 2002/0124047 A1 | 9/2002 | Gartner et al. | |
| 2002/0124098 A1 | 9/2002 | Shaw | |
| 2002/0129123 A1 | 9/2002 | Johnson et al. | |
| 2002/0135611 A1 | 9/2002 | Deosaran et al. | |
| 2002/0138286 A1 | 9/2002 | Engstrom | |
| 2002/0138437 A1 | 9/2002 | Lewin et al. | |
| 2002/0143989 A1 | 10/2002 | Huitema et al. | |
| 2002/0147770 A1 | 10/2002 | Tang | |
| 2002/0147774 A1 | 10/2002 | Lisiecki et al. | |
| 2002/0150094 A1 | 10/2002 | Cheng et al. | |
| 2002/0156911 A1 | 10/2002 | Croman et al. | |
| 2002/0161767 A1 | 10/2002 | Shapiro et al. | |
| 2002/0163882 A1 | 11/2002 | Bornstein et al. | |
| 2002/0165912 A1 | 11/2002 | Wenocur et al. | |
| 2002/0188722 A1 | 12/2002 | Banerjee et al. | |
| 2002/0198953 A1 | 12/2002 | O'Rourke et al. | |
| 2003/0002484 A1 | 1/2003 | Freedman | |
| 2003/0009591 A1 | 1/2003 | Hayball et al. | |
| 2003/0028642 A1 | 2/2003 | Agarwal et al. | |
| 2003/0033283 A1 | 2/2003 | Evans et al. | |
| 2003/0037139 A1 | 2/2003 | Shteyn | |
| 2003/0065739 A1 | 4/2003 | Shnier | |
| 2003/0074401 A1 | 4/2003 | Connell et al. | |
| 2003/0079027 A1 | 4/2003 | Slocombe et al. | |
| 2003/0093523 A1 | 5/2003 | Cranor et al. | |
| 2003/0099202 A1 | 5/2003 | Lear et al. | |
| 2003/0101278 A1 | 5/2003 | Garcia-Luna-Aceves et al. | |
| 2003/0120741 A1 | 6/2003 | Wu et al. | |
| 2003/0133554 A1 | 7/2003 | Nykanen et al. | |
| 2003/0135509 A1 | 7/2003 | Davis et al. | |
| 2003/0140087 A1 | 7/2003 | Lincoln et al. | |
| 2003/0145038 A1 | 7/2003 | Tariq et al. | |
| 2003/0145066 A1 | 7/2003 | Okada et al. | |
| 2003/0149581 A1 * | 8/2003 | Chaudhri et al. | 705/1 |
| 2003/0154284 A1 | 8/2003 | Bernardin et al. | |
| 2003/0163722 A1 | 8/2003 | Anderson, IV | |
| 2003/0172145 A1 | 9/2003 | Nguyen | |
| 2003/0172183 A1 | 9/2003 | Anderson, IV et al. | |
| 2003/0172291 A1 | 9/2003 | Judge et al. | |
| 2003/0174648 A1 | 9/2003 | Wang et al. | |
| 2003/0182305 A1 | 9/2003 | Balva et al. | |
| 2003/0182413 A1 | 9/2003 | Allen et al. | |
| 2003/0182447 A1 | 9/2003 | Schilling | |
| 2003/0187935 A1 | 10/2003 | Agarwalla et al. | |
| 2003/0187970 A1 | 10/2003 | Chase et al. | |
| 2003/0191822 A1 | 10/2003 | Leighton et al. | |
| 2003/0200394 A1 | 10/2003 | Ashmore et al. | |
| 2003/0204602 A1 | 10/2003 | Hudson et al. | |
| 2003/0229682 A1 | 12/2003 | Day | |
| 2003/0233423 A1 | 12/2003 | Dilley et al. | |
| 2003/0233455 A1 | 12/2003 | Leber et al. | |
| 2003/0236700 A1 | 12/2003 | Arning et al. | |
| 2004/0010621 A1 | 1/2004 | Afergan et al. | |
| 2004/0019518 A1 | 1/2004 | Abraham et al. | |
| 2004/0024841 A1 | 2/2004 | Becker et al. | |
| 2004/0030620 A1 | 2/2004 | Benjamin et al. | |
| 2004/0034744 A1 | 2/2004 | Karlsson et al. | |
| 2004/0039798 A1 | 2/2004 | Hotz et al. | |
| 2004/0044731 A1 | 3/2004 | Chen et al. | |
| 2004/0044791 A1 | 3/2004 | Pouzzner | |
| 2004/0059805 A1 | 3/2004 | Dinker et al. | |
| 2004/0064501 A1 | 4/2004 | Jan et al. | |
| 2004/0073596 A1 | 4/2004 | Kloninger et al. | |
| 2004/0073867 A1 | 4/2004 | Kausik et al. | |
| 2004/0078468 A1 | 4/2004 | Hedin et al. | |
| 2004/0078487 A1 | 4/2004 | Cernohous et al. | |

(56) References Cited

U.S. PATENT DOCUMENTS

| | | |
|---|---|---|
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0161541 A1 | 7/2006 | Cencini |
| 2006/0168088 A1* | 7/2006 | Leighton et al. ............... 709/207 |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271375 A1 | 11/2007 | Hwang |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |

(56) References Cited

U.S. PATENT DOCUMENTS

| | | |
|---|---|---|
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang et al. |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0034470 A1 | 2/2010 | Valencia-Campo et al. |
| 2010/0036944 A1 | 2/2010 | Douglis et al. |
| 2010/0057894 A1 | 3/2010 | Glasser |
| 2010/0070603 A1 | 3/2010 | Moss et al. |
| 2010/0088367 A1 | 4/2010 | Brown et al. |
| 2010/0088405 A1* | 4/2010 | Huang et al. ............ 709/224 |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0293479 A1 | 11/2010 | Rousso et al. |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |
| 2011/0153941 A1 | 6/2011 | Spatscheck et al. |
| 2011/0191449 A1 | 8/2011 | Swildens et al. |
| 2011/0238501 A1 | 9/2011 | Almeida |
| 2011/0238793 A1 | 9/2011 | Bedare et al. |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0276623 A1 | 11/2011 | Girbal |
| 2012/0036238 A1 | 2/2012 | Sundaram et al. |
| 2012/0066360 A1* | 3/2012 | Ghosh ............ 709/223 |
| 2012/0124184 A1 | 5/2012 | Sakata et al. |
| 2012/0131177 A1 | 5/2012 | Brandt et al. |
| 2012/0166516 A1 | 6/2012 | Simmons et al. |
| 2012/0169646 A1 | 7/2012 | Berkes et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303804 A1 | 11/2012 | Sundaram et al. |
| 2012/0311648 A1 | 12/2012 | Swildens et al. |
| 2013/0041872 A1 | 2/2013 | Aizman et al. |
| 2013/0086001 A1 | 4/2013 | Bhogal et al. |
| 2013/0130221 A1 | 5/2013 | Kortemeyer et al. |
| 2013/0198341 A1 | 8/2013 | Kim |
| 2013/0212300 A1 | 8/2013 | Eggleston et al. |
| 2013/0246567 A1 | 9/2013 | Green et al. |
| 2013/0268616 A1 | 10/2013 | Sakata et al. |
| 2013/0339429 A1 | 12/2013 | Richardson et al. |
| 2014/0075109 A1 | 3/2014 | Richardson et al. |
| 2014/0143320 A1 | 5/2014 | Amazon Technologies, Inc. |

FOREIGN PATENT DOCUMENTS

| | | |
|---|---|---|
| CN | 101189598 A | 5/2008 |
| CN | 101460907 A | 6/2009 |
| EP | 2008167 | 12/2008 |
| JP | 2001-0506093 | 5/2001 |
| JP | 2002-044137 | 2/2002 |
| JP | 2003-167810 A | 6/2003 |
| JP | 2003-167813 A | 6/2003 |
| JP | 2003522358 A | 7/2003 |
| JP | 2004-533738 A | 11/2004 |

(56) References Cited

FOREIGN PATENT DOCUMENTS

| | | |
|---|---|---|
| JP | 2005-537687 | 12/2005 |
| JP | 2007-133896 A | 5/2007 |
| JP | 2009-071538 A | 4/2009 |
| JP | 2012-209623 | 10/2012 |
| WO | WO 2007/007960 A1 | 1/2007 |
| WO | WO 2007/126837 A3 | 11/2007 |
| WO | WO 2010/002603 A1 | 1/2010 |
| WO | WO 2012/044587 A1 | 4/2012 |

OTHER PUBLICATIONS

Supplementary European Search Report in Application No. 09727694.3 mailed Jan. 30, 2012 in 6 pages.
International Search Report and Written Opinion in PCT/US2011/053302 mailed Nov. 28, 2011 in 11 pages.
Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Baglioni et al., "Preprocessing and Mining Web Log Data for Web Personalization", LNAI 2829, 2003, pp. 237-249.
Liu et al., "Combined mining of Web server logs and web contents for classifying user navigation patterns and predicting users' future requests," Data & Knowledge Engineering 61 (2007) pp. 304-330.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
Singapore Examination Report in Application No. 201006837-7 mailed May 16, 2012.
First Office Action in Chinese Application No. 200980119993.1 dated Jul. 4, 2012.
First Office Action in Chinese Application No. 200980119995.0 dated Jul. 6, 2012.
First Office Action in Chinese Application No. 200980145872.4 dated Nov. 29, 2012.
Search Report and Written Opinion in Singapore Application No. 201103333-9 mailed Nov. 19, 2012.
Singapore Written Opinion in Application No. 201006836-9, mailed Apr. 30, 2012 in 10 pages.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Chipara et al, "Realtime Power-Aware Routing in Sensor Network", IEEE, 2006, 10 pages.
Examination Report in Singapore Application No. 201103333-9 dated Aug. 13, 2013.
International Preliminary Report on Patentability in PCT/US2011/053302 mailed Apr. 2, 2013.
International Preliminary Report on Patentability in PCT/US2011/061486 mailed May 22, 2013.
Office Action in Canadian Application No. 2726915 dated May 13, 2013.
Office Action in Canadian Application No. 2741895 dated Oct. 21, 2013.
Office Action in Chinese Application No. 200780020255.2 dated Mar. 4, 2013.
Office Action in Chinese Application No. 200980119993.1 dated Oct. 21, 2013.
Office Action in Chinese Application No. 200980119995.0 dated Apr. 15, 2013.
Office Action in Japanese Application No. 2011-516466 mailed Mar. 6, 2013.
Office Action in Korean Application No. 10-2011-7002461 mailed May 29, 2013.
Preliminary Examination in Chinese Application No. 201180053405.6 dated May 28, 2013.
Second Office Action in Chinese Application No. 200980119993.1 dated Mar. 12, 2013.
Gunther et al, "Measuring Round Trip Times to determine the Distance between WLAN Nodes", Dec. 18, 2004, Technical University Berlin, all pages.
Examination Report in Singapore Application No. 201006874-0 dated May 16, 2012.
Second Office Action in Japanese Application No. 2011-516466 mailed Mar. 17, 2014.
Preliminary Examination in Chinese Application No. 201310717573.1 dated Feb. 25, 2014.
First Office Action in Japanese Application No. 2013-529454 mailed Feb. 3, 2014 in 6 pages.
First Office Action issued in Australian Application No. 2011307319 mailed Mar. 6, 2014 in 5 pages.
Office Action in Japanese Application No. 2013-540982 dated Jun. 2, 2014.
Written Opinion in Singapore Application No. 201303521-7 dated May 20, 2014.
Office Action in Japanese Application No. 2013-123086 mailed Apr. 15, 2014 in 3 pages.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
Bellovin, S., "Distributed Firewalls," ;login;:37-39, Nov. 1999, http://www.cs.columbia.edu/-smb/papers/distfw. html, 10 pages, retrieved Nov. 11, 2005.

(56) References Cited

OTHER PUBLICATIONS

Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
First Office Action in Chinese Application No. 200980111426.1 mailed Feb. 16, 2013.
Gruener, J., "A Vision of Togetherness," May 24, 2004, NetworkWorld, retrieved May 3, 2006, from, http://www.networkworld.com/supp/2004/ndc3/0524virt.html, 9 pages.
International Preliminary Report on Patentability in PCT/US2007/007601 mailed Sep. 30, 2008 in 8 pages.
International Search Report and Written Opinion in PCT/US07/07601 mailed Jul. 18, 2008 in 11 pages.
International Search Report and Written Opinion in PCT/US2010/060567 mailed on Mar. 28, 2012.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kenshi, P., "Help File Library: Iptables Basics," Justlinux, retrieved Dec. 1, 2005, from http://www.justlinux.com/nhf/Security/Iptables_Basics.html, 4 pages.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Office Action in Candian Application No. 2741895 dated Feb. 25, 2013.
Office Action in Japanese Application No. 2011-502138 mailed Feb. 1, 2013.
Office Action in Japanese Application No. 2011-502140 mailed Dec. 7, 2012.
Office Action in Japanese Application No. 2012-052264 mailed Dec. 11, 2012 in 26 pages.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection, Nov. 1, 2004, University of Oslo Department of Informatics," retrieved Mar. 8, 2006, from http://gnist.org/~lars/studies/master/StrandLars-master.pdf, 158 pages.
Supplementary European Search Report in Application No. 07754164.7 mailed Dec. 20, 2010 in 7 pages.
Supplementary European Search Report in Application No. 09728756.9 mailed Jan. 8, 2013.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
First Office Action in Chinese Application No. 200980111422.3 dated Apr. 13, 2012.
First Office Action in Japanese Application No. 2011-502139 dated Nov. 5, 2013.
Office Action in Indian Application No. 3742/KOLNP/2008 dated Nov. 22, 2013.
Third Office Action in Chinese Application No. 200980111426.1 mailed Jul. 7, 2014.
Decision of Rejection in Application No. 2011-502139 dated Jun. 30, 2014.
First Office Action in Japanese Application No. 2011-503091 dated Nov. 18, 2013.
Search Report and Written Opinion issued in Singapore Application No. 201006873-2 mailed on Oct. 12, 2011.
Search Report and Written Opinion in Singapore Application No. 201301573-0 mailed Jul. 1, 2014.

\* cited by examiner

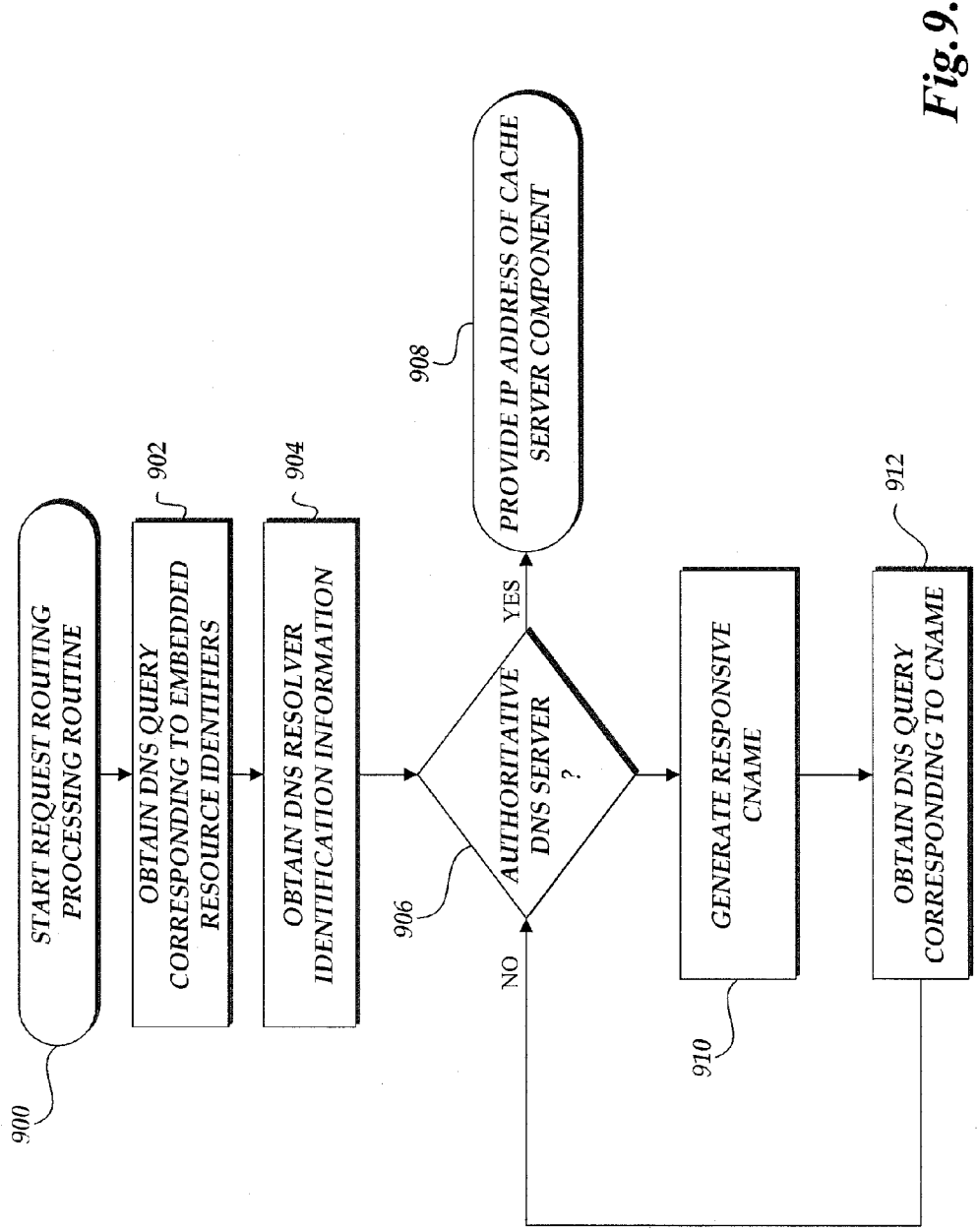

REQUEST ROUTING MANAGEMENT BASED ON NETWORK COMPONENTS

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider would provide client computing devices data associated with the Web page as well as the data associated with the embedded resources.

Some content providers attempt to facilitate the delivery of requested content, such as Web pages and/or resources identified in Web pages, through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service. Additionally, in embodiments in which computing devices utilize an Internet service provider ("ISP") to provide connectivity, the CDN service provider can consider additional factors associated with the interaction between the CDN service provider, client computing and ISP devices, such as a DNS resolver component.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a flow diagram illustrative of a request routing processing routine implemented by a service provider.

DETAILED DESCRIPTION

Generally described, the present disclosure is directed to managing request routing functionality associated with resource requests for one or more resources associated with a content provider. Specifically, aspects of the disclosure will be described with regard to the management and processing of request routing functionality by a service provider, such as a content delivery network ("CDN") service provider, on behalf of a content provider. Illustratively, the request routing functionality can correspond to the processing of domain name service ("DNS") requests for resources by computing devices and the resolution of the DNS requests by the identification of a network address of a computing device that will provide the requested resources. Based on the processing of DNS queries initiated by a client computing device, the CDN service provider can measure CDN service provider performance measurement information associated with the generation and processing of DNS requests by network components associated with the client computing devices. Examples of the network components can include DNS resolvers associated with the client computing device. Additionally, examples of performance measurement information can include the measurement of latencies associated with transmitting and processing the DNS queries, data packet loss associated with the transmittal of the DNS queries, data throughput associated with the transmittal of the DNS queries, available bandwidth associated with a communication channel and the like.

Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider, that may provide additional services and functionality including network-based storage services, caching services, application hosting, or other services. However, one skilled in the relevant art will appreciate that a service provider need not provide all, or any, of the additional services or functionality that may be associated with some service providers, such as a CDN service provider.

Figure 1:
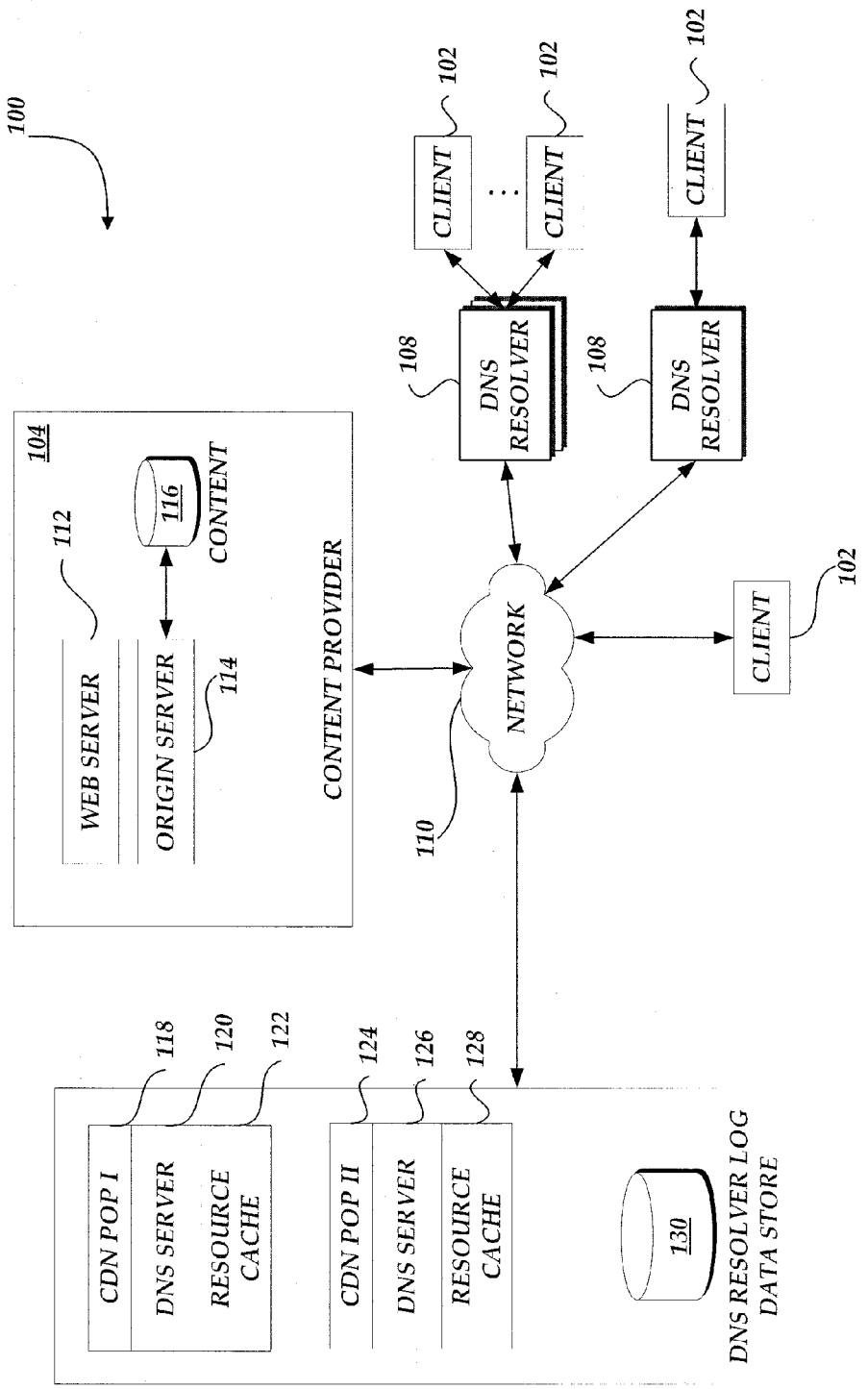
FIG. 1 is a block diagram illustrative of content delivery environment including a number of client computing devices, a content provider, and a content delivery network service provider.

FIG. 1 is a block diagram illustrative of content delivery environment 100 for the managing registration of a content provider with a service provider, such as a CDN service provider, and subsequent processing of at least a portion of content requests on behalf of the content provider. As illustrated in FIG. 1, the content delivery environment 100 includes a number of client computing devices 102 (generally referred to as clients) for requesting content from a content provider 104, a network storage provider, and/or a CDN service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 112, such as a wide area network or local area network. For example, the client computing devices 102 may be equipped with networking equipment and browser software applications that facilitate communications via the Internet or an intranet.

Illustratively, at least some of the client computing devices 102 utilize a DNS resolver component 108, such as a DNS name server, that receives DNS queries from a client computing device 102 and then generates the DNS queries attributed to the client computing device, or on behalf of the client computing device. In one embodiment, the DNS resolver component 108 may be a local DNS component provided by an enterprise network to which the client computing device 102 belongs. In another embodiment, the local DNS resolver component 108 may be provided by an Internet Service Provider ("ISP") that provides the communication network connection to the client computing device 102. In embodiments in which the client computing devices 102 utilize a DNS resolver component 108, one skilled in the relevant art will appreciate that the DNS queries generated on behalf of the client computing devices would be associated with the IP address of the DNS resolver component 108 in accordance with traditional networking protocols. In further embodiments, a client computing device 102 may be associated with multiple DNS resolver components 108, such as a multi-tiered hierarchy of DNS resolver components. For example, a client computing device 102 may be associated with a first DNS resolver component 108 provided by an enterprise network, which in turn is in communication with one or more DNS resolver components provided by an ISP. In other examples, a single network provider may make multiple DNS resolver components 108 available or responsive to the client computing device 102 DNS queries.

The content delivery environment 100 can also include a content provider 104 in communication with the one or more client computing devices 102 via the communication network 110. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources and the like. Additionally, although the origin server component 114 and associated storage component 116 are logically associated with the content provider 104, the origin server component 114 and associated storage components 116 may be geographically distributed throughout the communication network 112 in a manner to best serve various demographics of client computing devices 102.

Although not illustrated in FIG. 1, the content provider 104 can be associated with a number of additional or supplement components to facilitate interaction with client computing devices 102 or service providers. For example, a content provider 104 may maintain one or more DNS name server components that are operative to receive DNS queries related to registered domain names associated with the content provider 104. The one or more DNS name servers can be authoritative to resolve client computing device DNS queries corresponding to the registered domain names of the content provider 104. The content provider 104 can also maintain additional storage components, such as proxy servers, or utilize network storage service providers to maintain at least a portion of the content/resources provided to the client computing devices 102.

With continued reference to FIG. 1, the content delivery environment 100 can further include a service provider, generally referred to as the CDN service provider 106, in communication with the one or more client computing devices 102 and the content provider 104 via the communication network 110. The CDN service provider 106 illustrated in FIG. 1 corresponds to a logical association of one or more computing devices associated with a service provider. Specifically, the CDN service provider 106 can include a number of Point of Presence ("POP") locations 118, 124 that correspond to nodes on the communication network 110. Each POP 118, 124 includes a DNS component 120, 126 made up of a number of DNS server computing devices for resolving DNS queries from the client computers 102. Each POP 118, 124 also optionally includes a resource cache component 122, 128 made up of a number of cache server computing devices for storing resources from content providers or network storage providers and transmitting various requested resources to various client computers 102. The DNS components 120, 126 and the resource cache components 122, 128 may further include additional software and/or hardware components that facilitate communications, including, but not limited to, load balancing or load sharing software/hardware components.

Still further, the CDN service provider 106 can include additional data stores for managing request routing information. Specifically, in an illustrative embodiment, the CDN service provider 106 can include a DNS resolver log data store 130 for maintaining information regarding DNS queries provided by the DNS resolvers 108 on behalf of client computing devices 102. As previously described, examples of performance measurement information can include latency information, data packet loss information, data throughput information, available bandwidth associated with a communication channel, and the like. Additionally, the DNS resolver log data can further include performance measurement information or other information associated with the transmittal or processing of DNS queries. Although the DNS resolver log data store 130 is illustrated as a single, centrally located data store, one skilled in the relevant art will appreciate that the DNS resolver log data store 130 may be distributed among several data stores or be maintained, at least in part, among the POPs 118, 124.

In an illustrative embodiment, the DNS component 120, 126 and resource cache component 122, 128 are considered to be logically grouped, regardless of whether the components, or portions of the components, are physically separate. Additionally, although the POPs 118, 124 are illustrated in FIG. 1 as logically associated with the CDN service provider 106, the POPs will be geographically distributed throughout the communication network 110 in a manner to best serve various demographics of client computing devices 102. Additionally, one skilled in the relevant art will appreciate that the CDN service provider 106 can be associated with various additional computing resources, such as additional computing devices for administration of content and resources, and the like. Even further, the components of the CDN service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-8, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
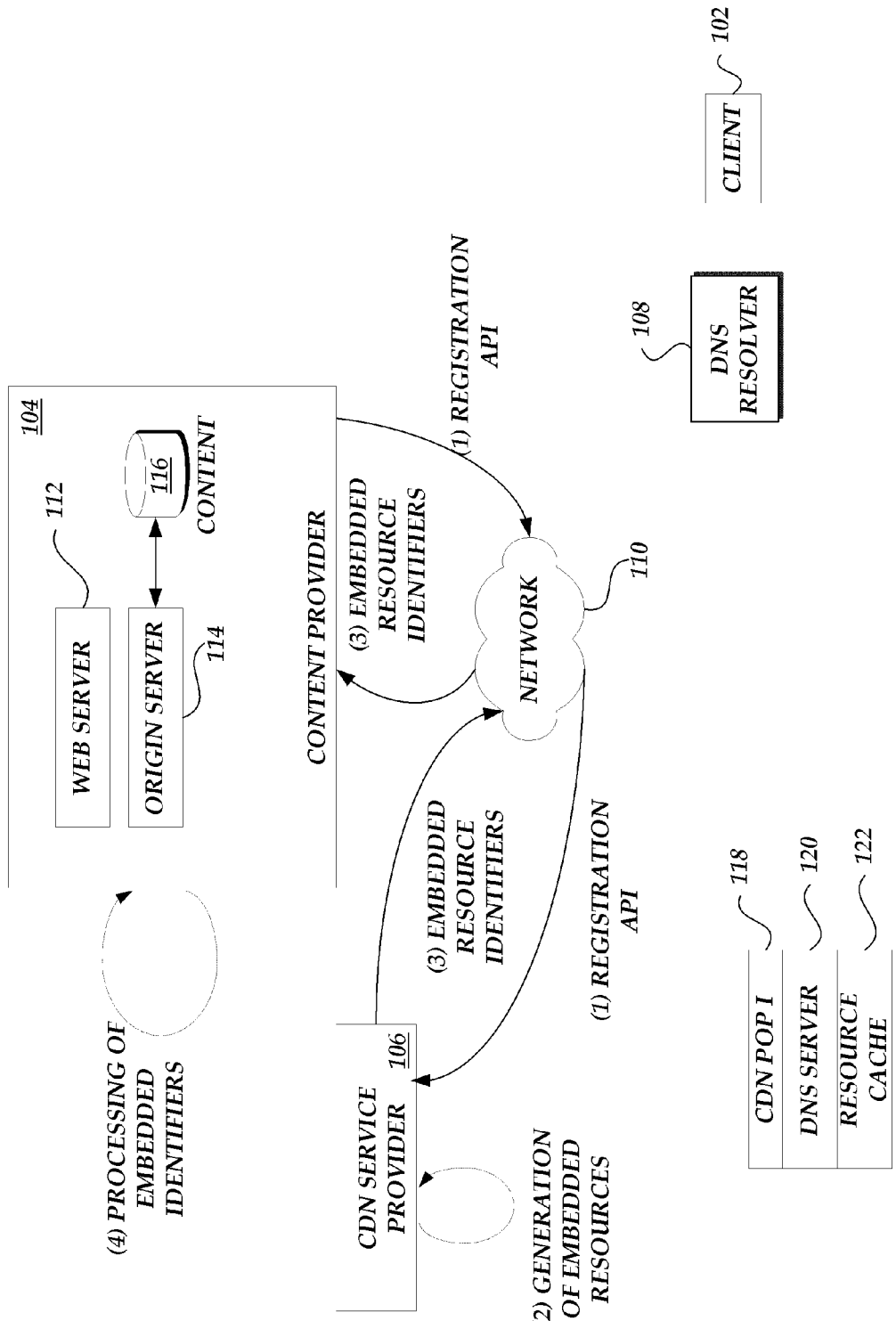
FIG. 2 is a block diagram of the content delivery environment of FIG. 1 illustrating the registration of a content provider with a CDN service provider.

With reference to FIG. 2, an illustrative interaction for the optional registration of a content provider 104 with the CDN service provider 106 for hosting content on behalf of the content provider 104 will be described. As illustrated in FIG. 2, the CDN service provider content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104, or at least perform the processes described herein. Illustratively, the registration API can include the identification of the origin server 114 of the content provider 104 that may provide requested resources to the CDN service provider 106. In addition or alternatively, the registration API can include the content to be stored by the CDN service provider 106 on behalf of the content provider 104. Additionally, the content provider 104 can specify one or more network storage providers (not illustrated) that may act as an origin server for the content provider 104.

The CDN service provider 106 returns the embedded resource identifiers to the content provider 104 along with any additional information. In turn, the content provider 104 can then store the embedded resource identifiers for embedding in requested content or otherwise embed (or associate) the embedded resource identifiers with requested content (such as Web page markup language), which are described in greater detail below. In an illustrative embodiment, the embedded resource identifiers can be applicable to multiple content providers 104. Alternatively, the embedded resource identifiers can be unique to each particular content provider 104. Still further, the CDN service provider 106 may provide additional logic to the content providers 104 that controls the circumstances and/or methodologies for embedding the embedded resource identifiers into content. For example, the embedded resource identifiers can include instructions (or executable code) that defines the type of content (e.g., specific Web pages) for which the embedded resource identifiers will apply.

Figure 3:
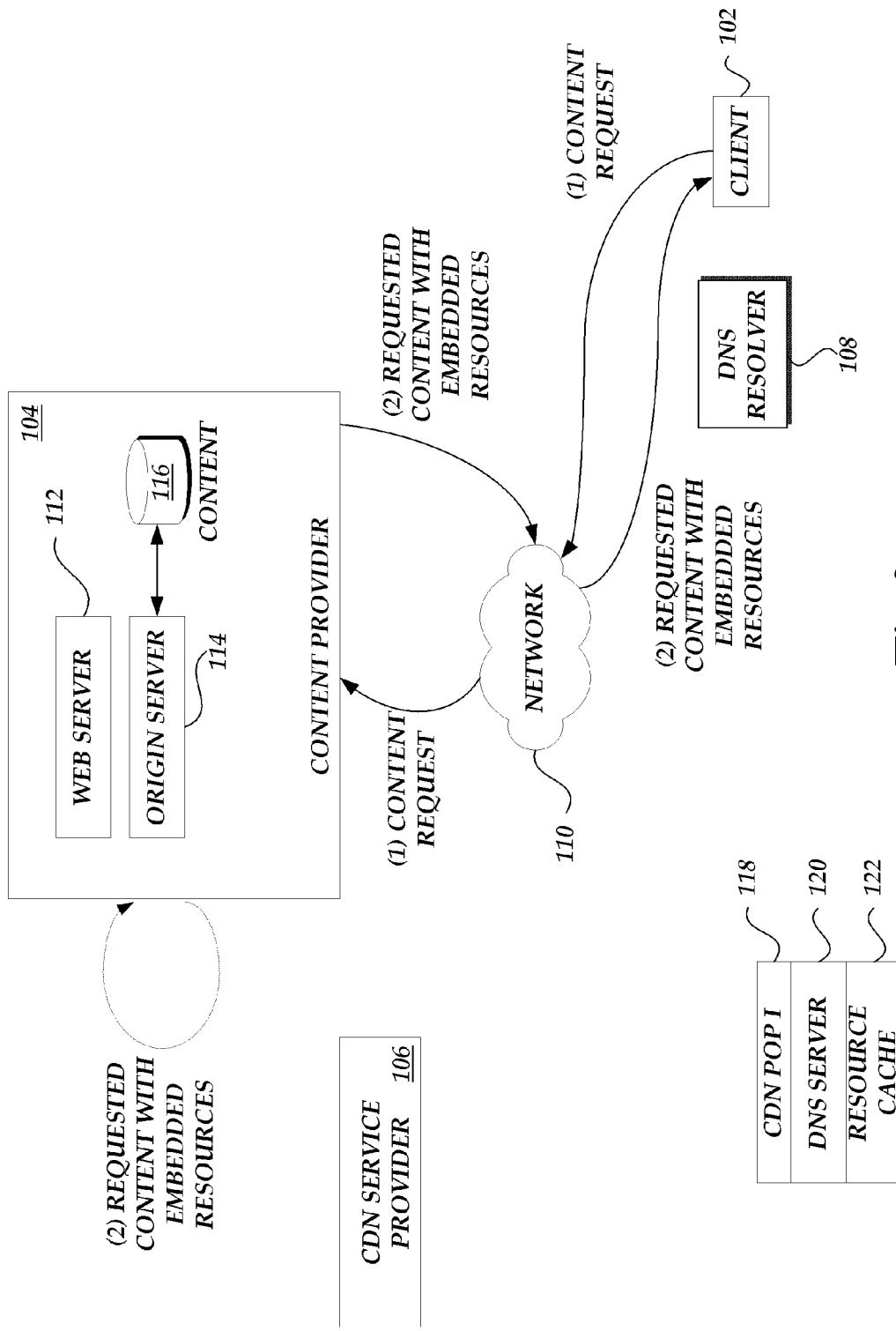
FIG. 3 is a block diagram of the content delivery environment of FIG. 1 illustrating the generation of resource requests by a client computing device.

With reference now to FIG. 3, after completion of the registration and embedding processes illustrated in FIG. 2, a client computing device 102 generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers that correspond to resource objects that should be obtained by the client computing device 102 as part of the processing of the requested content. The embedded resources can correspond to multi-media content, such as images, videos, text, etc. that will be processed by the client computing devices 102 and rendered on an output device. Although not illustrated in FIG. 3, the client computing device 102 would first issue a DNS query for the content provided by the content provider 104, which if properly resolved, would include the identification of the above mentioned IP address associated with the content provider. One skilled in the relevant art will appreciate that the resolution of the DNS query may involve multiple DNS queries to either the content provider 104 or other service provider.

Generally, the identification of the embedded resources provided by the content provider 104 will be in the form of resource identifiers that can be processed by the client computing device 102, such as through a browser software application. In an illustrative embodiment, the resource identifiers can be in the form of a uniform resource locator ("URL"). For purposes of an illustrative example, the URL can identify a domain of the CDN service provider 106 (e.g., CDNserviceprovider.com), a name of a resource to be requested (e.g., "resource.xxx") and a path where the resource will be found (e.g., "path"). Additionally, in an illustrative embodiment, the URL can also include one or more labels that include additional information utilized by the CDN service provider 106 in the request routing process (e.g., "additional_information"). Examples of the additional information can include client computing device identifiers, user account identifiers, geographic identification information, POP identifiers, DNS resolver performance measurement identification information, and the like. In this illustrative example, the URLs of the embedded resource have the form of:

http://additional_information.CDNserviceprovider.com/path/resource.xxx

Figure 4:
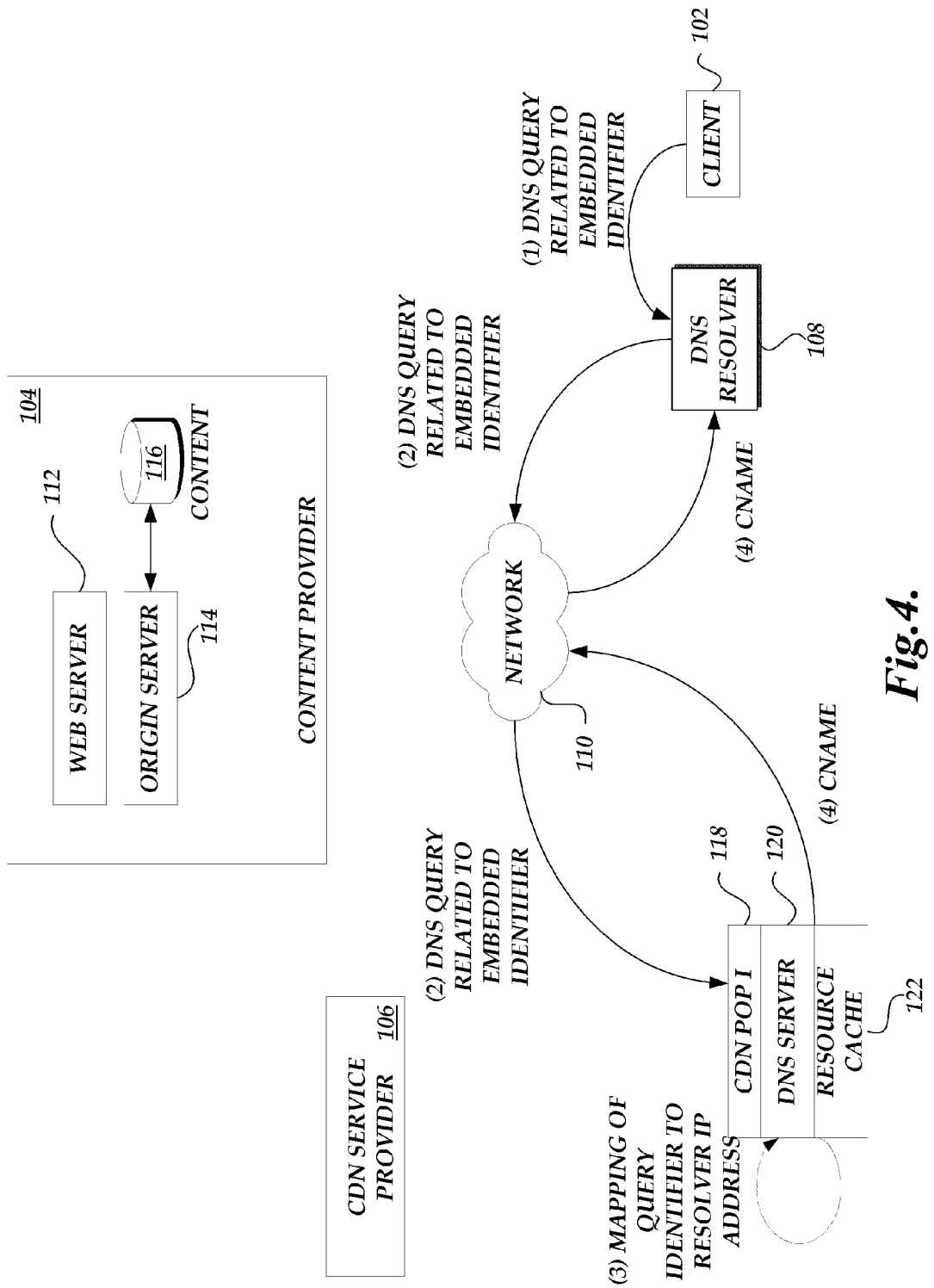
FIG. 4 is a block diagram of the content delivery environment of FIG. 1 illustrating the generation of DNS queries by a client computing device corresponding to embedded resources by a client computing device.

With reference now to FIG. 4, upon receipt of the requested content, including the embedded resource identifiers provided by the CDN service provider 106, the client computing device 102 would first transmit a DNS query through its DNS resolver 108 to request an IP address of a computing device corresponding to the unique identifier provided by the CDN service provider 106. In accordance with traditional request routing principles, the DNS query would be received by the DNS resolver 108 and then transmitted on behalf of the requesting client computing device 102.

By way of example, in accordance with traditional DNS request routing principles, a DNS query for the URL http://additional_information.CDNserviceprovider.com/path/resource.xxx would first include the identification of a DNS server authoritative to the "." and the "com" portions of the URL to the DNS resolver 108. The issuance of DNS queries corresponding to the "." and the "com" portions of a URL are well known and have not been illustrated. After partially resolving the modified URL according to the "." and "com" portions of the URL, the DNS resolver 108 then issues another DNS query for the resource URL that results in the identification of the DNS server corresponding to the ".CDNserviceprovider" portion of the URL, as illustrated in FIG. 4, illustrated as the DNS server component 120 of POP 118.

The receiving DNS server component 120 obtains the DNS query from the DNS resolver component 108 and processes the DNS query. In an illustrative embodiment, the DNS server component 120 determines that the processing of the DNS query should be, at least in part, used to measure performance of the DNS resolver 108 or other network component. In one embodiment, the DNS query may not correspond to an actual resource that will be delivered to the client computing device 102. In this embodiment, the resolution of the DNS query may result in no response from a DNS server. In another embodiment, the resolution of the DNS query may result in the generation of additional actions/responses from the DNS server for purposes of performance measurement.

Alternatively, the DNS query may correspond to an actual resource provided by the CDN service provider 106 on behalf of the content provider 104. Illustratively, the "additional_information" portion of the URL may include information that will be utilized to determine whether the CDN service provider 106 should utilize the DNS query for performance measurement or will be utilized in the determination of the performance measurement. For example, a client computing device may execute a script prior to the generation of the DNS query that modifies the URL to include various identifiers or timing information to the URL.

To facilitate the performance measurement, the receiving POP, POP 118, can obtain information from the DNS query or collect additional information. The collected information can be maintained in the DNS resolver log data store 130. One skilled in the relevant art will appreciate, that typically, a receiving DNS server can resolve DNS queries by identifying an IP address of a cache server component, such resource cache component 122, that will process the request for the requested resource. The selected resource cache component can process the request by either providing the requested resource if it is available or attempting to obtain the requested resource from another source, such as a peer cache server computing device or the origin server 114 of the content provider 104. However, in this illustrative embodiment, as an alternative to selecting a cache server component, the CDN service provider 106 can maintain sets of various alternative resource identifiers that can be utilized for more refined request routing purposes. Additionally, in this embodiment, the alternative resource identifiers can be utilized to measure the performance of the DNS resolver component 108 (or other network components). Specifically, the alternative resource identifiers can be provided by the CDN service provider 106 to the client computing device 102 such that a subsequent DNS query on the alternative resource identifier will resolve to a different DNS server component within the CDN service provider's network.

In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information (e.g., "additional information"), such as request routing information, performance measurement information, and the like. An illustrative CNAME record can have the form of:

CNAME additional_information.cdnprovider.com

In an illustrative embodiment, the CNAME records are generated and provided by the DNS servers to direct DNS queries to a different DNS server of the CDN service provider 106. In one embodiment, the subsequent DNS queries (corresponding to the CNAME) will be directed, or otherwise be received by, a different DNS server of the CDN service provider 106. As will be explained in greater detail below, the CNAME can include additional request routing information that causes the DNS query to be received by a different POP or otherwise cause the subsequent DNS query to be forwarded to a DNS server at a different POP. In other embodiments, the subsequent DNS queries will be directed toward the same DNS server that received the previous DNS query.

In some embodiments, the selection of different DNS servers to receive one or more subsequent DNS queries may be based on a determined appropriateness of other DNS servers to process DNS queries from a particular client computing device 102 or set of client computing devices. As used in accordance with the present disclosure, appropriateness can be defined in any manner by the CDN service provider 106 for a variety of purposes. In one example, the CDN service provider 106 can attempt to direct DNS queries to DNS servers, such as in the returned CNAME, according to geographic criteria. The geographic criteria can correspond to geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS server in a region corresponding to the content provider's regional plan. In this example, the DNS server component 118 may also obtain geographic information from the client directly (such as information provided by the client computing device or ISP) or indirectly (such as inferred through a client computing device's IP address).

In another example, the CDN service provider 106 can attempt to direct DNS queries to DNS servers according to service level criteria. The service level criteria can correspond to service or performance metrics contracted between the CDN service provider 106 and the content provider 104.

Examples of performance metrics can include latencies of data transmission between the CDN service provider POPs and the client computing devices 102, total data provided on behalf of the content provider 104 by the CDN service provider POPs, error rates for data transmissions, and the like.

In still a further example, the CDN service provider 106 can attempt to direct DNS queries to DNS servers according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106, network data error rates, and the like).

In accordance with an illustrative embodiment, the DNS server maintains a data store that defines CNAME records for various original URLs. If a DNS query corresponding to a particular original URL matches an entry in the data store, the receiving DNS server component 120 returns a CNAME record as defined in the data store. In an illustrative embodiment, the data store can include multiple CNAME records corresponding to a particular original URL. The multiple CNAME records would define a set of potential candidates that can be returned to the client computing device 102. In such an embodiment, the DNS server component 120, either directly or via a network-based service, can implement additional logic in selecting an appropriate CNAME from a set of possible of CNAMEs. For example, the DNS servers can have logic to determine which CNAME to return for purposes of testing different components or aspects of the CDN service provider 106. Examples of such different aspects can include testing different software application platforms, testing different supported languages, testing different ISPs, and the like. In an illustrative embodiment, each DNS server component 120, 126 maintains the same data stores that define CNAME records, which can be managed centrally by the CDN service provider 106. Alternatively, each DNS server component 120, 126 can have POP specific data stores that define CNAME records, which can be managed centrally by the CDN service provider 106 or locally at the POP 118, 124.

The returned CNAME can also include request routing information that is different from or in addition to the information provided in URL/CNAME of the current DNS query. For example, if the CNAME selection is based on regional plan, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, if the CNAME is based on regional plan, a specific regional plan domain (e.g., "cdnprovider-region1.com") could be used in the domain name portion of the specific CNAME record. Any additional request routing information can be prepended to the existing request routing information in the current URL/CNAME such that the previous request routing information would not be lost (e.g., serviceplan.regionalplan.cdnprovider.com). One skilled in the relevant art will appreciate that additional or alternative techniques and/or combination of techniques may be used to include the additional request routing information in the CNAME record that is selected by the DNS server component 120.

Figure 5:
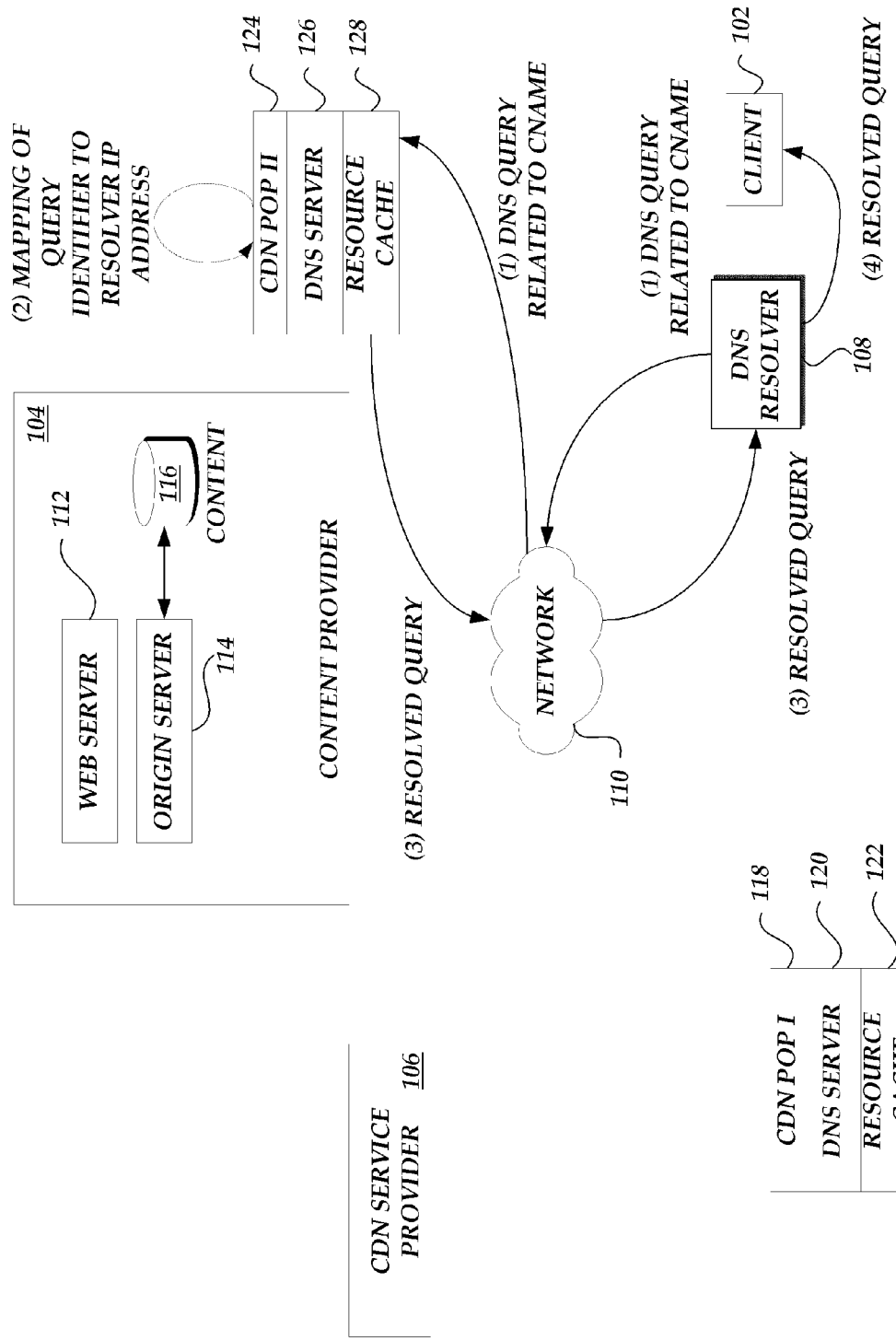
FIG. 5 is a block diagram of the content delivery environment of FIG. 1 illustrating the generation of DNS queries by a client computing device corresponding to alternative identifiers by a client computing device.

With reference now to FIG. 5, in an illustrative embodiment, the DNS resolver 108 obtains the CNAME, or other alternative identifier, provided by the receiving DNS server and processes the CNAME. In one aspect, the DNS resolver 108 can process the return information to log or determine performance measurement information, such as a total time from the transmittal of the original DNS query. Additionally, in accordance with network principles, the DNS resolver 108 then transmits a DNS query corresponding to the returned CNAME. As previously discussed with regard to FIG. 4, the DNS query process could first start with DNS queries for the "." and "com" portions, followed by a query for the "cdnserviceprovider" portion of the CNAME. To the extent, however, that the results of previous DNS queries can be cached (and remain valid), the DNS resolver 108 can utilize the cached information and does not need to repeat the entire process. However, at some point, depending on whether the CNAME provided by DNS server component 120 (FIG. 4) and the previous URL/CNAME share common CDN service provider domains, resolves to a different POP provided by the CDN service provider 106.

As illustrated in FIG. 5, the DNS server component 126 of POP 124 is now authoritative based on the different information in the current CNAME previously provided by the DNS server component 120. As previously described, the DNS server component 126 can then determine whether to resolve the DNS query on the CNAME with an IP address of a cache component that will process the content request or whether to provide another alternative resource identifier selected in the manner described above. In an illustrative embodiment, the DNS server components can utilize a variety of information in selecting a resource cache component. In one example, the DNS server component can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

Based on the processes illustrated in FIGS. 4 and 5, the CDN service provider 106, DNS resolver 108 or other component can utilize performance measurement information for a variety of purposes. For example, the collected performance measurement information can be utilized to determine an ordered priority of POPs for a particular DNS resolver component 108 or sets of DNS resolver components. In another example, the performance measurement information can be utilized to verify an existing prioritization of POPs for a particular DNS resolver component 108 or sets of DNS resolver components. Still further, the performance measurement information can be combined with other information mapping client computing devices 102 with DNS resolver components 108 to determine prioritized or optimized POPs for client computing devices 102 or groups of client computing devices associated with one or more DNS resolvers 108.

Figure 6:
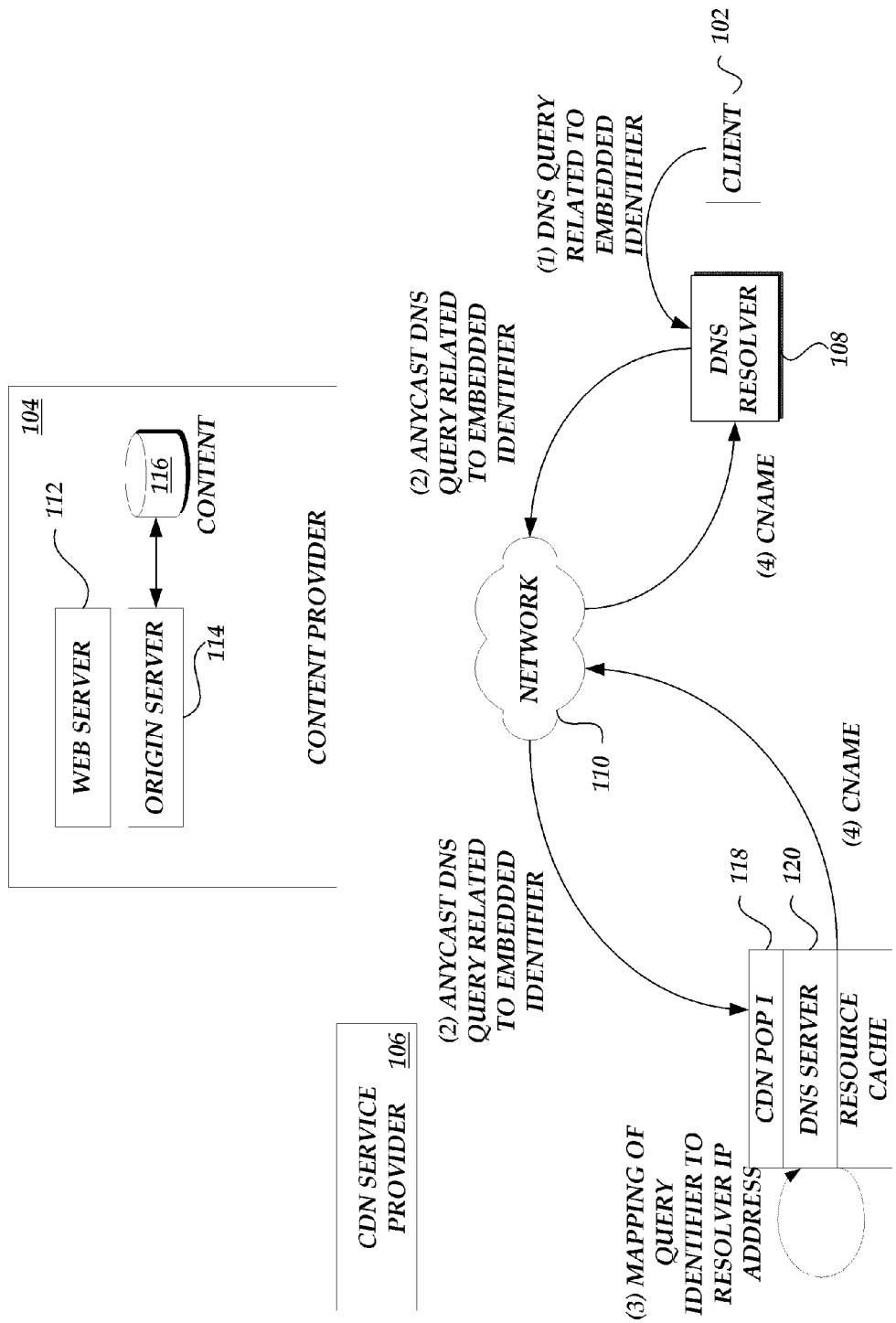
FIG. 6 is a block diagram of the content delivery environment of FIG. 1 illustrating the transmission of DNS queries by a client computing device in accordance with a network routing scheme by a client computing device.

With reference now to FIG. 6, in another embodiment to measure performance measurement after the receipt of content including one or more embedded identifiers (FIG. 3), the client computing device 102 would first transmit a DNS query through its DNS resolver 108 to request an IP address of a computing device corresponding to the unique identifier provided by the CDN service provider 106. The DNS query would be received by the DNS resolver 108 and then transmitted on behalf of the requesting client computing device 102.

As previously described with regard to FIG. 4, by way of example, in accordance with traditional DNS request routing principles, a DNS query for the URL would first include the identification of a DNS server authoritative to the "." and the "com" portions of the URL to the DNS resolver 108. The issuance of DNS queries corresponding to the "." and the "com" portions of a URL are well known and have not been illustrated. After partially resolving the modified URL according to the "." and "com" portions of the URL, the DNS resolver 108 then issues another DNS query for the resource URL that results in the identification of the DNS server corresponding to the ".cdnserviceprovider" portion of the URL. Specifically, the successful resolution of the ".cdnserviceprovider" portion of the original URL identifies a network address, such as an IP address, of a DNS server associated with the CDN service provider 106. In this embodiment, the IP address can be shared by one or more POPs. Accordingly, the further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

As previously discussed with regard to FIG. 4, the receiving DNS server component 120 obtains the DNS query from the DNS resolver component 108 and processes the DNS query. In an illustrative embodiment, the DNS server component 120 determines that the processing of the DNS query should be, at least in part, used to measure performance of the DNS resolver 108 or other network component. In one embodiment, the DNS query may not correspond to an actual resource that will be delivered to the client computing device 102. Alternatively, the DNS query may correspond to an actual resource provided by the CDN service provider 106 on behalf of the content provider 104. Illustratively, the "additional_information" portion of the URL may include information that will be utilized to determine whether the CDN service provider 106 should utilize the DNS query for performance measurement or whether it will be utilized in the determination of the performance measurement. For example, a client computing device may execute a script prior to the generation of the DNS query that modifies the URL to include various identifiers or timing information in the URL.

To facilitate the performance measurement, the receiving POP, POP 118, can obtain information from the DNS query or collect additional information. The collected information can be maintained in the DNS resolver log data store 130. One skilled in the relevant art will appreciate that, typically, a receiving DNS server can resolve DNS queries by identifying an IP address of a cache server component, such resource cache component 122, that will process the request for the requested resource. The selected resource cache component can process the request by either providing the requested resource if it is available or attempting to obtain the requested resource from another source, such as a peer cache server computing device or the origin server 114 of the content provider 104. However, in this illustrative embodiment, as an alternative to selecting a cache server component, the CDN service provider 106 can maintain sets of various alternative resource identifiers that can be utilized for more refined request routing purposes. Additionally, in this embodiment, the alternative resource identifiers can be utilized to measure the performance of the DNS resolver component 108 (or other network components). Specifically, the alternative resource identifiers can be provided by the CDN service provider 106 to the client computing device 102 such that a subsequent DNS query on the alternative resource identifier will resolve to a different DNS server component within the CDN service provider's network. As previously discussed, the alternative resource identifier can correspond to a CNAME.

Figure 7:
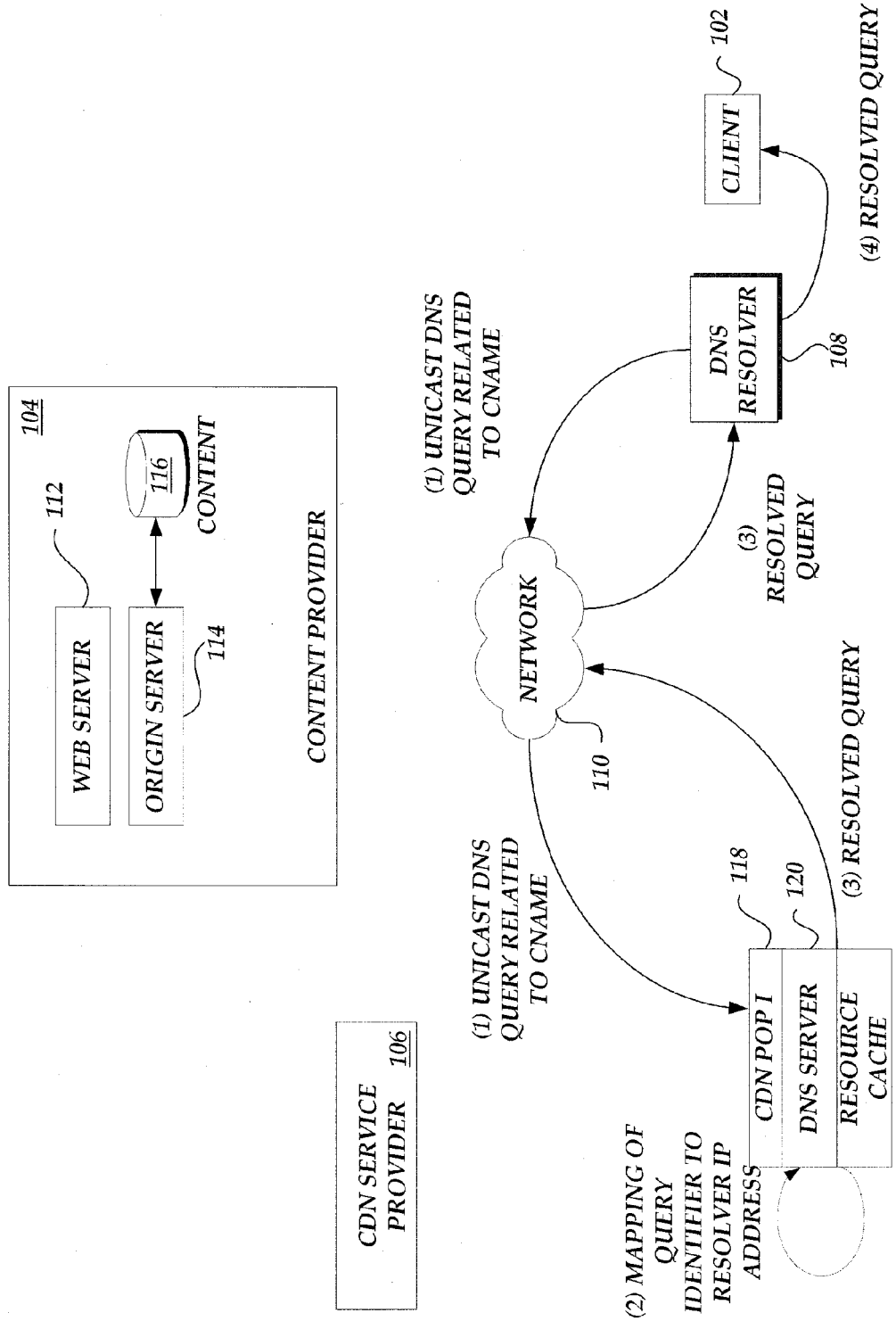
FIG. 7 is a block diagram of the content delivery environment of FIG. 1 illustrating the transmission of DNS queries by a client computing device in accordance with an alternative network routing scheme by a client computing device.

With reference now to FIG. 7, in an illustrative embodiment, the DNS resolver 108 obtains the CNAME, or other alternative identifier, provided by the receiving DNS server and processes the CNAME. In one aspect, the DNS resolver 108 can process the return information to log or determine performance measurement information, such as a total time from the transmittal and processing of the original DNS query, available bandwidth, packet loss, data throughput, etc. Additionally, in accordance with network principles, the DNS resolver 108 then transmits a DNS query corresponding to the returned CNAME. As previously discussed with regard to FIG. 4, the DNS query process could first start with DNS queries for the "." and "com" portions, followed by a query for the ".cdnserviceprovider" portion of the CNAME. To the extent, however, that the results of a previous DNS queries can be cached (and remain valid), the DNS resolver 108 can utilize the cached information and does not need to repeat the entire process. However, in this embodiment, at some point, the DNS resolver 108 transmits a DNS query for the ".cdnserviceprovider" utilizing a different network routing schema. Specifically, in an illustrative embodiment, the further DNS query to a shared IP address or unique IP address utilizes a one-to-one network routing schema, such as unicast, such that a specific POP will receive the DNS query.

In this embodiment, the CNAME is selected such that the subsequent DNS query will be received by the same POP utilizing the different network routing schema. Examples of different routing schemas can include the utilization of different communication protocols, such as anycast and unicast. In other examples, the routing schema can include the specification of different communication network paths or the utilization of different ISPs. For example, the IP address of the DNS servers of the CDN service provider may be selected such that the first and second DNS queries (and possibly additional DNS queries) may be transmitted via different communication network ISPs. In another example, a communication protocol, such as the Border Gateway Protocol, can be manipulated to facilitate the transmission of DNS queries along different communication network paths. As illustrated in FIG. 7, the DNS server component 120 of POP 118 is again authoritative based on the information in the current CNAME previously provided by the DNS server component 118. As previously described, the DNS server component 120 can then determine whether to resolve the DNS query on the CNAME with an IP address of a cache component that will process the content request or whether to provide another alternative resource identifier selected in the manner described above. In an illustrative embodiment, the DNS server components can utilize a variety of information in selecting a resource cache component. In one example, the DNS server component can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

Figure 8:
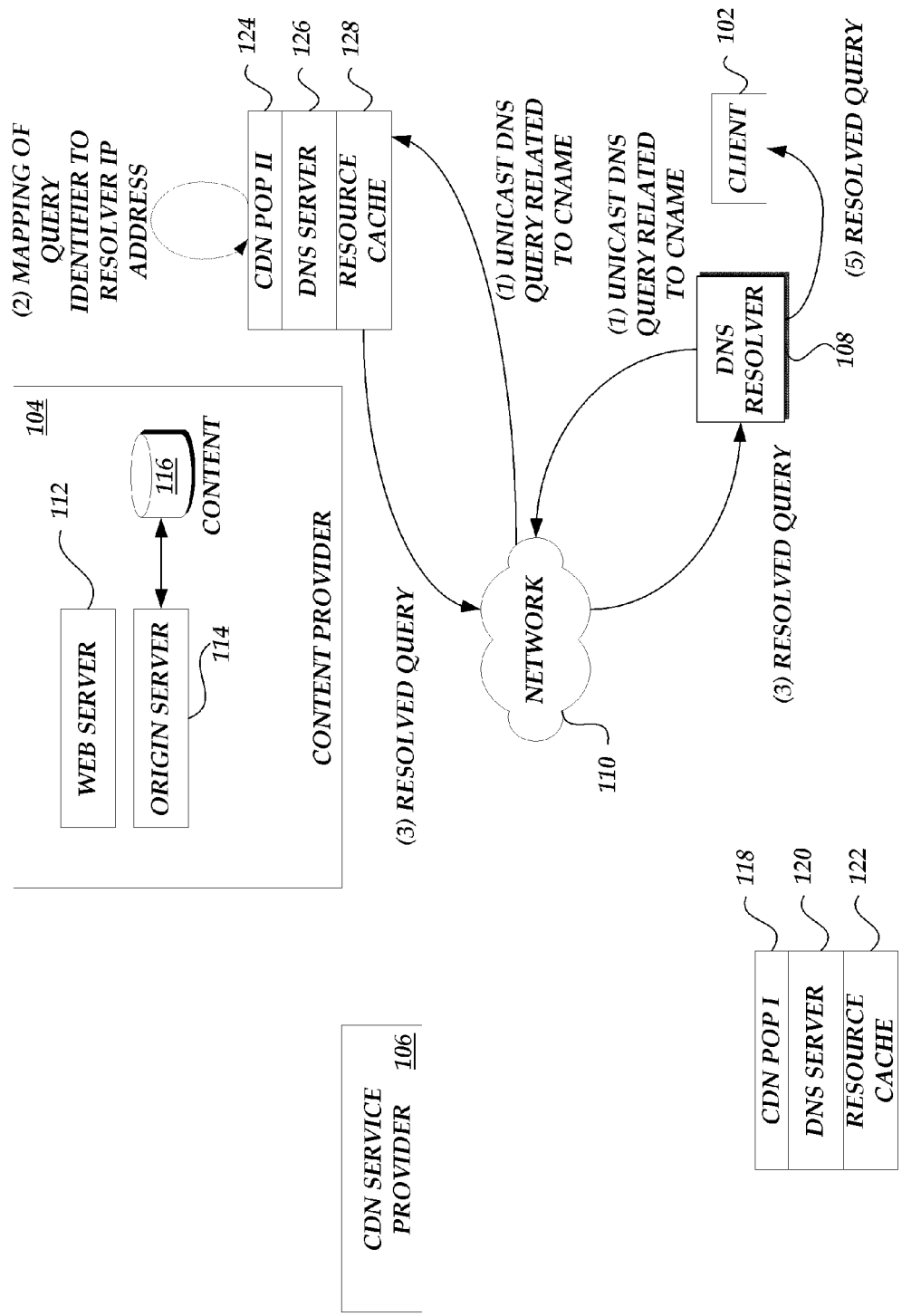
FIG. 8 is a block diagram of the content delivery environment of FIG. 1 illustrating the transmission of DNS queries by a client computing device in accordance with an alternative network routing scheme by a client computing device.

With reference now to FIG. 8, in an alternative to the embodiment illustrated in FIG. 7, the CNAME is selected such that the subsequent DNS query will be received by a different POP utilizing the different network routing schema. Accordingly, as illustrated in FIG. 8, the DNS server component 126 of POP 124 is now authoritative based on the different information in the current CNAME previously provided by the DNS server component 120. As previously described, the DNS server component 126 can then determine whether to resolve the DNS query on the CNAME with an IP address of a cache component that will process the content request or whether to provide another alternative resource identifier selected in the manner described above. In an illustrative embodiment, the DNS server components can utilize a variety of information in selecting a resource cache component. In one example, the DNS server components can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

Based on the processes illustrated in FIGS. 6, 7 and 8, the CDN service provider, DNS resolver 108 or other component can utilize performance measurement information for a variety of purposes. For example, the collected performance measurement information can be utilized to determine an ordered priority of routing schemas utilized to access particular POPs. In another example, the performance measurement information can be utilized to verify an existing prioritization of POPs for a particular DNS resolver component 108 or sets of DNS resolver components. Still further, the performance measurement information can be combined with other information mapping client computing devices 102 with DNS resolver components 108 to determine prioritized or optimized POPs for client computing devices 102 or groups of client computing devices associated with one or more DNS resolvers 108.

With reference now to FIG. 9, a request routing processing routine 900 implemented by the CDN service provider 106 will be described. One skilled in the relevant art will appreciate that actions/steps outlined for routine 900 may be implemented by one or many computing devices/components that are associated with the CDN service provider 106. Accordingly, routine 900 has been logically associated as being performed by the CDN service provider 106.

At block 902, one of the DNS server components 120, 126 obtains a DNS query corresponding to resource identifier (the "receiving DNS server"). As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. At block 904, the receiving DNS server obtains DNS resolver 108 identification information from the DNS query, such as an IP address or other identifier.

At decision block 906, a test is conducted to determine whether the current DNS server is authoritative to resolve the DNS query. In one illustrative embodiment, the DNS server can determine whether it is authoritative to resolve the DNS query if there are no CNAME records corresponding to the received resource identifier (e.g., no additional performance measurement will take place).

If the current DNS server is authoritative (including a determination that the same DNS server will be authoritative for subsequent DNS queries), the current DNS server resolves the DNS query by returning the IP address of a cache server component at block 908. In a non-limiting manner, a number of methodologies for selecting an appropriate resource cache component have been previously discussed. Additionally, as described above, the IP address may correspond to a specific cache server of a resource cache component or generally to group of cache servers.

Alternatively, if at decision block 906, the DNS server is not authoritative, at block 910, the DNS server component selects and transmits an alternative resource identifier. As described above, the DNS server component can utilize a data store to identify an appropriate CNAME as a function of the current DNS query. Additionally, the DNS server component can also implement additional logical processing to select from a set of potential CNAMES. As previously described, in one embodiment, the CNAME may be selected to direct the DNS resolver 108 to a different POP. In another embodiment, the CNAME may be selected to direct the DNS resolver 108 to utilize a different request routing schema, regardless of whether the subsequent CNAME DNS query is directed to the same or different DNS server. At block 912, different DNS server components receive a DNS query corresponding to the CNAME. The routine 900 then returns to decision block 906 and continues to repeat as appropriate.

It will be appreciated by one skilled in the relevant art that there are a number of ways to modify the routing information associated with requests from a class of client computing devices. It will further be appreciated by one skilled in the relevant art that the timing at which performance is monitored and updates to routing information are made can vary.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components such as a CD-ROM, DVD-ROM, or network interface; further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for processing content comprising:
   providing, by a service provider, at least one identifier for causing a client computing device to generate a request for content to the service provider, the at least one identifier to be included as an embedded resource provided by a content provider;
   obtaining, by the service provider, a first domain name service (DNS) query for content from a DNS resolver component responsive to at least one embedded resource provided by the content provider, the DNS resolver component providing the first DNS query on behalf of the client computing device;
   responsive to obtaining the first DNS query, determining, by the service provider, performance measurement information corresponding to obtaining the first DNS query;
   generating, by the service provider, an alternative identifier responsive to the request for content from the client computing device;
   transmitting, by the service provider, the alternative identifier to the DNS resolver component;
   obtaining, by the service provider, a second DNS query for the alternative identifier from the DNS resolver component associated with the client computing device;
   responsive to obtaining the second DNS query, determining, by the service provider, performance measurement information corresponding to obtaining the second DNS query responsive to the alternative identifier provided by the service provider;
   determining, by the service provider, latency information corresponding to obtaining the first and second DNS queries, the latency information corresponding to a communication latency between the DNS resolver component and an identifiable component of the service provider; and
   transmitting, by the service provider, information responsive to the received second DNS query.

2. The method as recited in claim 1, wherein the at least one identifier for causing client computing devices to generate a request for content to the service provider corresponds to a uniform resource locator of the service provider.

3. The method as recited in claim 1, wherein the alternative identifier corresponds to a canonical name record.

4. The method as recited in claim 3, wherein the alternative identifier includes a label representative of at least a portion of a network address associated with a content provider.

5. The method as recited in claim 3, wherein the alternative identifier includes a label representative of timing information.

6. The method as recited in claim 1, wherein the first DNS query is transmitted in accordance with a network routing schema.

7. The method as recited in claim 6, wherein the second DNS query is transmitted in accordance with the network routing schema.

8. The method as recited in claim 1, wherein the first and second DNS queries are obtained at a same identifiable component of the service provider.

9. The method as recited in claim 1, wherein the first and second DNS queries are obtained at separately identifiable components of the service provider.

10. The method as recited in claim 1, wherein the content provider corresponds to the service provider.

11. A method for processing content comprising:
    obtaining, by a service provider, a first domain name service (DNS) query for content from a network component responsive to at least one embedded resource identifier provided by a content provider, the network component transmitting the first DNS query on behalf of a client computing device to a component associated with the service provider;
    transmitting, by the service provider, an alternative identifier responsive to the first DNS query from the network component, the alternative identifier to cause the network component to transmit a second DNS query to a component associated with the service provider; and
    obtaining, by the service provider, the second DNS query for content from the network component responsive to the alternative identifier provided by the service provider, the network component providing the second DNS query on behalf of the client computing device; and
    determining, by the service provider, performance measurement information corresponding to obtaining the first and second DNS queries.

12. The method as recited in claim 11, wherein each of the at least one embedded resource identifier corresponds to a uniform resource locator of the service provider.

13. The method as recited in claim 11, wherein the alternative identifier corresponds to a canonical name record.

14. The method as recited in claim 13, wherein the alternative identifier references a domain different from a domain associated with the at least one embedded resource identifier.

15. The method as recited in claim 13, wherein the alternative identifier includes a label representative of request routing information identifying the component associated with the service provider.

16. The method as recited in claim 13, wherein the alternative identifier includes timestamp information.

17. The method as recited in claim 13, wherein the alternative identifier further includes a label representative of additional information associated with the client computing device.

18. The method as recited in claim 11, wherein the first DNS query is transmitted in accordance with a network routing schema.

19. The method as recited in claim 11, wherein the network component corresponds to a DNS resolver component.

20. The method as recited in claim 11, wherein the first and second DNS queries are obtained at a same identifiable component of the service provider.

21. The method as recited in claim 11, wherein the first and second DNS queries are obtained at separately identifiable components of the service provider.

22. The method as recited in claim 11, wherein the content provider corresponds to the service provider.

23. The method as recited in claim 11, wherein the performance measurement information corresponds to latency information associated with at least one of the transmittal and processing of the first and second DNS queries.

24. The method as recited in claim 11, wherein the performance measurement information corresponds to at least one of a bandwidth associated with at least one of the transmittal and processing of the first and second DNS queries, packet loss information associated with the first and second DNS queries, and throughput information associated with the first and second DNS queries.

25. A computer-implemented system for processing content, the system comprising:
   a data store for storing performance monitoring information associated with network components associated with client computing device requests for content; and
   a computing system in communication with said data store and associated with a service provider, the computing system including at least one hardware processor operative to:
      obtain a first domain name service (DNS) query for content from a network component responsive to at least one embedded resource identifier, the network component providing the first DNS query on behalf of a client computing device;
      transmit an alternative identifier responsive to the first DNS query from the network component, the alternative identifier to cause the network component to transmit a second DNS query to the service provider;
      obtain the second DNS query for content from the network component responsive to the alternative identifier provided by the service provider, the network component providing the second DNS query on behalf of the client computing device; and
      determine performance information corresponding to obtaining the first and second DNS queries.

26. The system as recited in claim 25, wherein each of the at least one embedded resource identifier corresponds to a uniform resource locator of the service provider.

27. The system as recited in claim 25, wherein the alternative identifier corresponds to a canonical name record.

28. The system as recited in claim 25, wherein the alternative identifier references a domain corresponding to a domain associated with the at least one embedded resource identifier.

29. The system as recited in claim 25, wherein the alternative identifier further includes timestamp information.

30. The system as recited in claim 25, wherein the first and second DNS queries are obtained at a same identifiable component of the service provider.

31. The system as recited in claim 25, wherein the first and second DNS queries are obtained at separately identifiable components of the service provider.

32. The system as recited in claim 25, wherein the performance measurement information corresponds to latency information associated with at least one of the transmittal and processing of the first and second DNS queries.

* * * * *